3,541,155
PHENOXYPENTANEDIONES
John J. D'Amico, Dunbar, W. Va., assignor to Monsanto Company, St. Louis, Mo., a corporation of Delaware
No Drawing. Filed May 16, 1968, Ser. No. 729,540
Int. Cl. C07c 49/80, 49/76
U.S. Cl. 260—590  2 Claims

ABSTRACT OF THE DISCLOSURE

Compounds of the formula

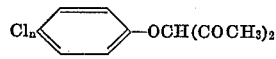

where $n$ is an integer from zero to five, inclusive, are described, which are useful as biological toxicants.

---

This invention relates to a class of phenoxy diketones and more particularly to phenoxy 2,4-pentanediones, which compounds are useful as biological toxicants.

The compounds of the present invention may be represented by the formula

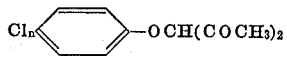

in which $n$ is an integer from zero to five, inclusive.

Preferred embodiments of the invention are described hereinafter.

EXAMPLE 1

A solution was prepared comprising 39.5 grams (0.2 mole) of 2,4,6-trichlorophenol, 13.2 grams (0.2 mole) of potassium hydroxide, 300 ml. of acetone, and 10 ml. of water. While stirring, there was added to the solution in one portion 26.9 grams (0.2 mole) of 3-chloro-2,4-pentanedione. The reaction mixture was stirred at 50° to 60° C. for 18 hours, then filtered to remove by-product salt. The acetone was removed in vacuo and to the resulting oily product was added 300 ml. of ether. The ether solution was washed with water until neutral to litmus, dried over sodium sulfate, and the ether removed in vacuo at a maximum temperature of 90° to 110° C./1-2 mm. The 3-(2,4,6-trichlorophenoxy)-2,4-pentanedione was obtained in 74.6% yield as a dark amber oil. Analysis gave 36.75% chlorine compared to 35.99% calculated for $C_{11}H_9Cl_3O_3$.

The following examples were prepared following the procedure of Example 1.

EXAMPLE 2

3-(2,4-dichlorophenoxy)-2,4-pentanedione from 2,4-dichlorophenol. It was obtained in 60% yield as an amber oil. Analysis gave 28.33% chlorine compared to 27.16% calculated for $C_{11}H_{10}Cl_2O_3$.

EXAMPLE 3

3-(2,4,5-trichlorophenoxy)-2,4-pentanedione from 2,4,5-trichlorophenol. It was obtained in 66.1% yield as an amber oil which formed a semi-solid on standing. Analysis gave 36.80% chlorine compared to 35.99% calculated for $C_{11}H_9Cl_3O_3$.

EXAMPLE 4

To a stirred solution of 64.3 grams (0.5 mole) of p-chlorophenol, 33 grams (0.5 mole) of 85% potassium hydroxide, 400 ml. of acetone, and 20 ml. of water was added in one portion 67.3 grams (0.5 mole) of 3-chloro-2,4-pentanedione. This caused the temperature of the reaction mixture to rise from 32° to 42° C. in one minute. The product was stirred at 55°-56° C. for 7 hours, cooled to 25° C. and by-product salt removed by filtration. The excess acetone was removed in vacuo. The residue was dissolved in 300 ml. of ethyl ether, the ether solution washed with water until neutral to litmus, and then dried over sodium sulfate. The ether was removed in vacuo at a maximum temperature of 80° to 90° C./1-2 mm. The 3-(p-chlorophenoxy)-2,4-pentanedione was obtained in 83% yield as a dark amber oil. Analysis gave 15.98% chlorine compared to 15.64% calculated for $C_{11}H_{11}ClO_3$.

The following examples were prepared following the procedure of Example 4.

EXAMPLE 5

3-(pentachlorophenoxy)-2,4-pentanedione from pentachlorophenol. It was obtained in 85.5% yield as a dark amber oil. Analysis gave 48.71% chlorine compared to 48.64% calculated for $C_{11}H_7Cl_5O_3$.

EXAMPLE 6

3-phenoxy-2,4-pentanedione from phenol. It was obtained in 86.5% yield as an amber oil.

The biological activity of the compounds of this invention was illustrated in a variety of experiments as will be described more fully hereinafter. The biological compositions were prepared according to common methods for convenience of application to the control of various organisms. The concentration of the compounds in the carrier or vehicle varied depending upon the organisms being treated and the particular compound of the generic formula which was employed. Compounds containing two or more chlorine atoms in the phenyl nucleus are preferred. Some of the compounds were especially effective against *Rhizoctonia solani* and *Venturia inaequalis*. This is significant because the organisms represent both soil and foliage disease-causing organisms.

Bacteriostatic activity was demonstrated against *Staphylococcus aureus* and *Salmonella typhosa*. Each of the test materials was dissolved in a non-toxic solvent to give respective 1%-stock solutions. The stock solutions were then added to nutrient agar to provide samples containing various concentrations of the test material. Petri dishes were respectively filled with the test mixture and the plates thus prepared inoculated with the test organism. After an incubation period of 48 hours at a temperature of 37° C., inspection of the plates showed complete inhibition of the growth of the organism at the indicated concentration with the following test materials. Identical agar test plates, except that no test material was present, showed normal uninhibited growth.

TABLE I

| Test material | At indicated concentration complete inhibition of— | |
|---|---|---|
| | S. aureus | S. typhosa |
| 3-phenoxy-2,4-pentanedione | 1/T* | 1/T |
| 3-(p-Chlorophenoxy)-2,4-pentanedione | 1/T | 1/T |
| 3-(2,4-dichlorophenoxy)-2,4-pentanedione | 1/10T | 1/10T |
| 3-(2,4,6-trichlorophenoxy)-2,4-pentanedione | 1/10T | 1/10T |
| 3-(2,4,5-trichlorophenoxy)-2,4-pentanedione | 1/100T | 1/10T |
| 3-(Pentachlorophenoxy)-2,4-pentanedione | 1/M** | 1/T |

NOTE.—*T=1,000; **M=1,000,000.

Fungistatic activity was demonstrated against *Aspergillus niger*. In this test the test materials were mixed in predetermined concentrations with hot dextrose agar which was subsequently poured into Petri dishes, cooled, and allowed to harden. The nutrient agar containing the test material was then inoculated with the fungus organism and the samples incubated for five days at 25° C. Growth of the fungus was suppressed by the following compounds at the indicated concentration, while identical agar test plates containing no test material showed normal uninhibited growth.

TABLE II

| Test material | Concentration |
|---|---|
| 3-phenoxy-2,4-pentanedione | 1/T* |
| 3-(p-Chlorophenoxy)-2,4-pentanedione | 1/T |
| 3-(2,4-dichlorophenoxy)-2,4-pentanedione | 1/10T |
| 3-(2,4,6-trichlorophenoxy)-2,4-pentanedione | 1/10T |
| 3-(2,4,5-trichlorophenoxy)-2,4-pentanedione | 1/100T |
| 3-(Pentachlorophenoxy)-2,4-pentanedione | 1/10T |

Note.—*T=1,000.

3-(pentachlorophenoxy)-2,4-pentanedione protected apple foliage from *Venturia inaequalis*, causative organism of apple scab. A 1.0-stock solution of the test material in a non-toxic solvent was made up, and an aliquot thereof diluted to the desired concentration and applied to the leaves of new growth of apple seedlings. Twenty-four hours later, conidia of *Venturia inaequalis* were sprayed on the same foliage. The inoculation was obtained from four isolates of Venturia representing the three races and a wild isolate, all cultured on potato dextrose broth and harvested after four weeks growth. Spores from all cultures were mixed and the spore load adjusted to 10,000 spores/1 ml. The inoculated plates were then incubated in a greenhouse chamber and disease incidence recorded after 14–20 days incubation. Perfect control at 10 parts per million was observed.

The products of Examples 1, 3, and 5 were tested against the soil fungus *Rhizoctonia solani*. Testing was conducted by blending cornmeal-sand cultures of the organism into autoclave-sterilized soil to achieve essentially a mono-organism soil type. Soufflé cups with a capacity of 30 grams were filled with the soil type and 4 ml. of the experimental chemical (231 p.p.m.) were drenched over the surface of each. The final concentration based on soil weight is 30 p.p.m. (parts per million). The soufflé cups were then put into pans and these pans placed in an incubation chamber (90–100% relative humidity) for 48 hours. At the end of this time the treatments were observed and the results recorded. A similar testing procedure was conducted with similar soil which had not been chemically treated. Perfect control was observed with the products of Examples 3 and 5 and slight growth, growth on cornmeal-sand particles only, was observed with the product of Example 1, whereas normal growth was observed with the soil which had not been chemically treated.

Similar testing against the soil fungus *Pythium ultimum* showed no growth on cornmeal-sand particles when treated with 30 p.p.m. of the following test materials. Normal growth was observed with the untreated cornmeal-sand particles:

3-(p-chlorophenoxy)-2,4-pentanedione
3-(2,4-dichlorophenoxy)-2,4-pentanedione
3-(2,4,5-trichlorophenoxy)-2,4-pentanedione
3-(2,4,6-trichlorophenoxy)-2,4-pentanedione
3-(pentachlorophenoxy)-2,4-pentanedione The use as soil fungicides is conveniently effected by applying the toxicant to the soil at a toxic dosage within the range of one-fourth to twenty pounds per acre. Application within the range of two to ten pounds per acre is preferred. Some soil-borne fungi infest the stalks of plants, and the new toxicants may be applied to plants or to soil and, in general, to fungi and to their places of growth for the purpose of controlling fungus growth. The stalk-rot organisms which infest soil and plants to which the new toxicants are applied to control fungus growth comprise:

*Fusarium moniliforme*
*Fusarium moniliforme* var. subglutinans
*Gibberella zeae*
*Diplodia maydis*

The foregoing experiments demonstrate that the new compounds protect against the destructive effect of microorganisms including fungi and bacteria. Application of the chemical to the area to be protected, in which the organism may or may not already be present, in a concentration toxic to such micro-organisms, affords a high degree of protection. For achieving these various objects, it is often advantageous, where the compounds are applied in an aqueous medium, to incorporate into the aqueous medium a surface-active agent in small amounts sufficient to lower the surface tension of water. The amount will usually be within the range of 0.01–1.0%. Besides water, organic solvents and admixtures thereof, suitable inert carriers which include finely divided solids, as for example clay and silica, may be added.

At concentrations higher than required for control of apple scab, 3-(pentachlorophenoxy)-2,4-pentanedione is an effective herbicide. The tables below illustrate herbicidal activity. The toxicant was emulsified in water and the emulsion applied as a spray. In the foliage application the spray containing the concentrations of active ingredient shown in Table III was applied to the foliage of the plants and the effect recorded. In the pre-emergence tests the spray was applied to the ground of seeded plots before the grass or other plants emerged. The dosages are expressed in pounds per acre. The following phytotoxicity rating key was used.

| | Contact | Pre-emergence |
|---|---|---|
| No phytotoxicity | 0 | 0 |
| Slight phytotoxicity | 1 | 1 |
| Moderate phytotoxicity | 2 | 2 |
| Severe phytotoxicity | 3 | 3 |
| Dead | 4 | |

In the contact application the same plants were used as in the pre-emergence application, and a general phytotoxicity rating observed on the grass and broadleaf species, respectively.

TABLE III.—CONTACT APPLICATION

| | Percent concentration | | |
|---|---|---|---|
| | 0.5 | 0.2 | 0.05 |
| Grass | 4 | 2 | 0 |
| Broadleaf | 4 | 3 | 2 |

TABLE IV.—PRE-EMERGENCE APPLICATION

| | Phytotoxicity rating | |
|---|---|---|
| | 25 lbs./acre | 10 lbs./acre |
| Morning glory | 3 | 1 |
| Wild oats | 3 | 0 |
| Brome-cheat grass | 3 | 1 |
| Rye grass | 3 | 1 |
| Buckwheat | 3 | 3 |
| Radish-mustard | 3 | 0 |
| Sugar beet | 3 | 3 |
| Cotton | 1 | 0 |
| Corn | 0 | 0 |
| Foxtail | 3 | 1 |
| Barnyard grass | | 3 |
| Crab grass | 3 | 3 |
| Field bindweed | 3 | 1 |
| Pigweed | 3 | 3 |

At a concentration of five pounds per acre where was severe injury to pigweed.

It is intended to cover all changes and modifications of the examples of the invention herein chosen for purposes of disclosure which do not constitute departures from the spirit and scope of the invention. The matter contained in each of the following claims is to be read as part of the general description of the present invention.

What is claimed is:
1. 3-(pentachlorophenoxy)-2,4-pentadione.
2. 3-(2,4,5-trichlorophenoxy)-2,4-pentadione.

References Cited

FOREIGN PATENTS 1,067,417   6/1954   France.

OTHER REFERENCES

Brooker et al. J. Chem. Soc. (London) 1926, 1723–1729.

Henecka, Chemische Berichte 82, 32–35 (1949).

DANIEL D. HORWITZ, Primary Examiner

U.S. Cl. X.R.

424—331; 71—123